United States Patent [19]

Hempel

[11] Patent Number: 4,811,984
[45] Date of Patent: Mar. 14, 1989

[54] LID FOR CLOSING AN AUTOMOBILE BODY RECESS

[75] Inventor: Ulrich Hempel, Renningen, Fed. Rep. of Germany

[73] Assignee: Dr. Ing. h.c.F. Porsche Aktiengesellschaft, Stuttgart, Fed. Rep. of Germany

[21] Appl. No.: 148,355

[22] Filed: Jan. 25, 1988

[30] Foreign Application Priority Data

Jan. 31, 1987 [DE] Fed. Rep. of Germany ....... 3702903

[51] Int. Cl.⁴ .................. B60J 9/00; B25G 3/00
[52] U.S. Cl. .................. 296/97.22; 296/202; 403/227; 403/370
[58] Field of Search ........... 296/1 C, 146, 202, 97.22; 16/235, 238, 246; 403/227, 370, 374

[56] References Cited

U.S. PATENT DOCUMENTS

| | | | |
|---|---|---|---|
| 1,833,002 | 11/1931 | Smith | 403/227 |
| 2,390,168 | 12/1945 | Piot | 403/227 |
| 2,865,653 | 12/1958 | Nixon | 296/1 C X |
| 3,483,586 | 12/1969 | Watson | 16/246 |
| 3,561,798 | 2/1971 | Redfern | 403/370 X |
| 3,584,473 | 6/1971 | MacDonald et al. | 403/370 X |
| 3,841,771 | 10/1974 | Shankwitz et al. | 403/370 X |
| 3,870,361 | 3/1975 | Krause | 296/146 |
| 3,915,491 | 10/1975 | Montgomery | 296/1 C |
| 3,992,051 | 11/1976 | Hitch | 296/1 C |
| 4,527,825 | 7/1985 | Clouse | 296/1 C |

FOREIGN PATENT DOCUMENTS

| | | |
|---|---|---|
| 1743826 | 4/1957 | Fed. Rep. of Germany . |
| 1907659 | 9/1970 | Fed. Rep. of Germany . |
| 7631183 | 2/1977 | Fed. Rep. of Germany . |
| 2937166 | 4/1981 | Fed. Rep. of Germany . |
| 1438871 | 8/1972 | United Kingdom ...... 296/1 C |
| 2041070 | 9/1980 | United Kingdom ...... 296/1 C |
| 2069592 | 8/1981 | United Kingdom ...... 16/238 |
| 2093517 | 9/1982 | United Kingdom . |

Primary Examiner—Andres Kashnikow
Assistant Examiner—Timothy Newholm
Attorney, Agent, or Firm—Barnes & Thornburg

[57] ABSTRACT

A lid for closing an automobile body recess, particularly a filler inlet compartment lid for a motor vehicle, is pivotally connected by means of a hinge, a hinge arm being fastened at the body recess. In order to, on the one hand, achieve a surface transition from the lid to the adjacent outer wall of the body that is flush with the shell of the body and, on the other hand, ensure a surrounding, constant gap between the lid and the body opening, the hinge arm that faces the body recess is held in position at the body recess, by an adjusting device.

13 Claims, 3 Drawing Sheets

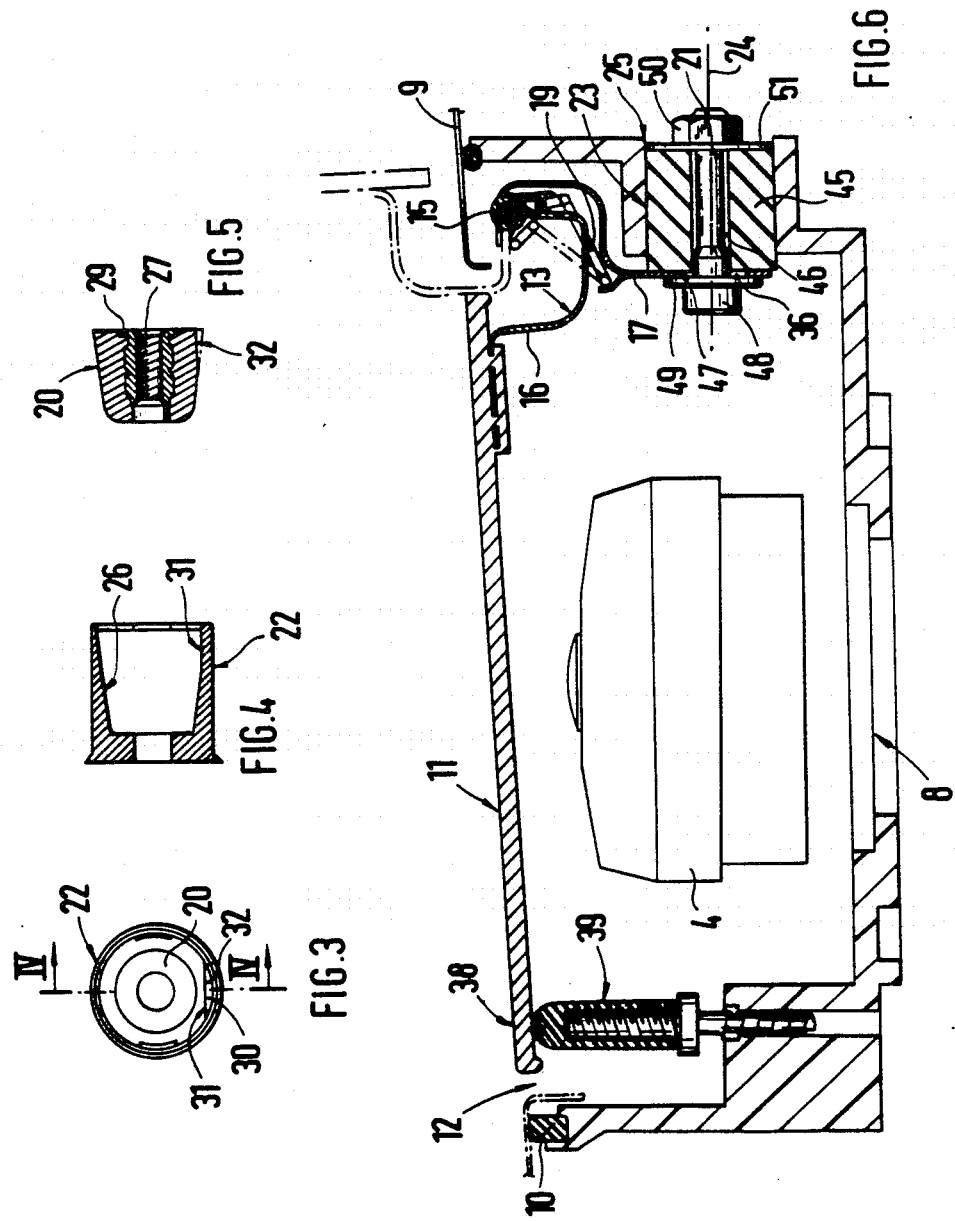

LID FOR CLOSING AN AUTOMOBILE BODY RECESS

BACKGROUND AND SUMMARY OF THE INVENTION

The invention relates to a lid for closing an automobile body recess, particularly a fuel filler inlet compartment lid for a motor vehicle, that is pivotally connected by means of a hinge, a hinge arm being fastened at the body recess.

A lid of the initially mentioned type is known on the basis of DE-AS No. 1 907 659. This arrangement has the disadvantage that neither at the lid, nor at the body recess, measures are taken in order to, on the one hand, ensure a course of the lid that is flush with the shell of the body and, on the other hand, ensure a constant gap, on the side of the circumference, between the lid and the adjacent body wall.

DE-GM No. 76 31 183 concerns a filler inlet compartment lid for closing an automobile body recess that receives the fuel filler neck of motor vehicles, where the filler inlet compartment lid is connected with the body recess by means of a snap joint. On the side that faces away from the snap joint, a U-shaped guide piece is injection-molded onto the interior surface of the filler inlet compartment lid, a rubber buffer being slidably held in this U-shaped guide piece and interacting with a diagonally extending surface of the body recess in the closed position of the filler inlet compartment lid.

This arrangement has the disadvantage that by means of the rubber buffer only the partial area of the filler inlet compartment lid that faces away from the snap joint can be adjusted to be flush with the shell of the body, but not the area facing the snap joint. It is very difficult, in the case of this construction, to obtain a constant gap between the filler inlet compartment lid and the adjacent opening of the body.

It is an object of the invention to take such measures at a lid or at an automobile body recess that manufacturing tolerances can be compensated in a simple way when the lid is mounted so that, on the one hand, a surface transition from the lid to the body takes place that is flush with the shell of the body and, on the other hand, a surrounding constant gap is ensured between the lid and the opening in the body. In addition, it must be possible to mount the lid rapidly and easily.

According to the invention, this objective is achieved by providing that the hinge arm projecting into the body recess, is held in position at the body recess by means of an adjusting device.

The main advantages achieved by means of the invention are that, by means of the mounting of an adjusting device between the hinge arm facing the body recess and the body recess, during the mounting, an adjustment of the lid is possible in all directions, whereby the gap on the side of the edge as well as the surface course of the lid that is flush with the shell of the body can be adjusted in the desired way with respect to the adjacent body. In addition, the lid can be fastened at the body recess in a fast and simple way. The components of the adjusting device can be manufactured easily and cost-effectively. The adjustable stop element also contributes to a good adjustment of the lid.

Other objects, advantages and novel features of the present invention will become apparent from the following detailed description of the invention when considered in conjunction with the accompanying drawings.

BRIEF DESCRIPTION OF THE DRAWINGS

FIG. 3 is a view in the direction of the Arrow S of FIG. 1 showing the adjusting device according to the invention;

FIG. 4 is a sectional view taken along line IV—IV of FIG. 3 showing the clamping part;

FIG. 5 is a sectional view of the expanding cone for the clamping device taken along line IV—IV of FIG. 3; and FIG. 6 is a sectional view corresponding to FIG. 1 but showing another embodiment of an adjusting device.

DETAILED DESCRIPTION OF THE DRAWINGS

Figure 1:
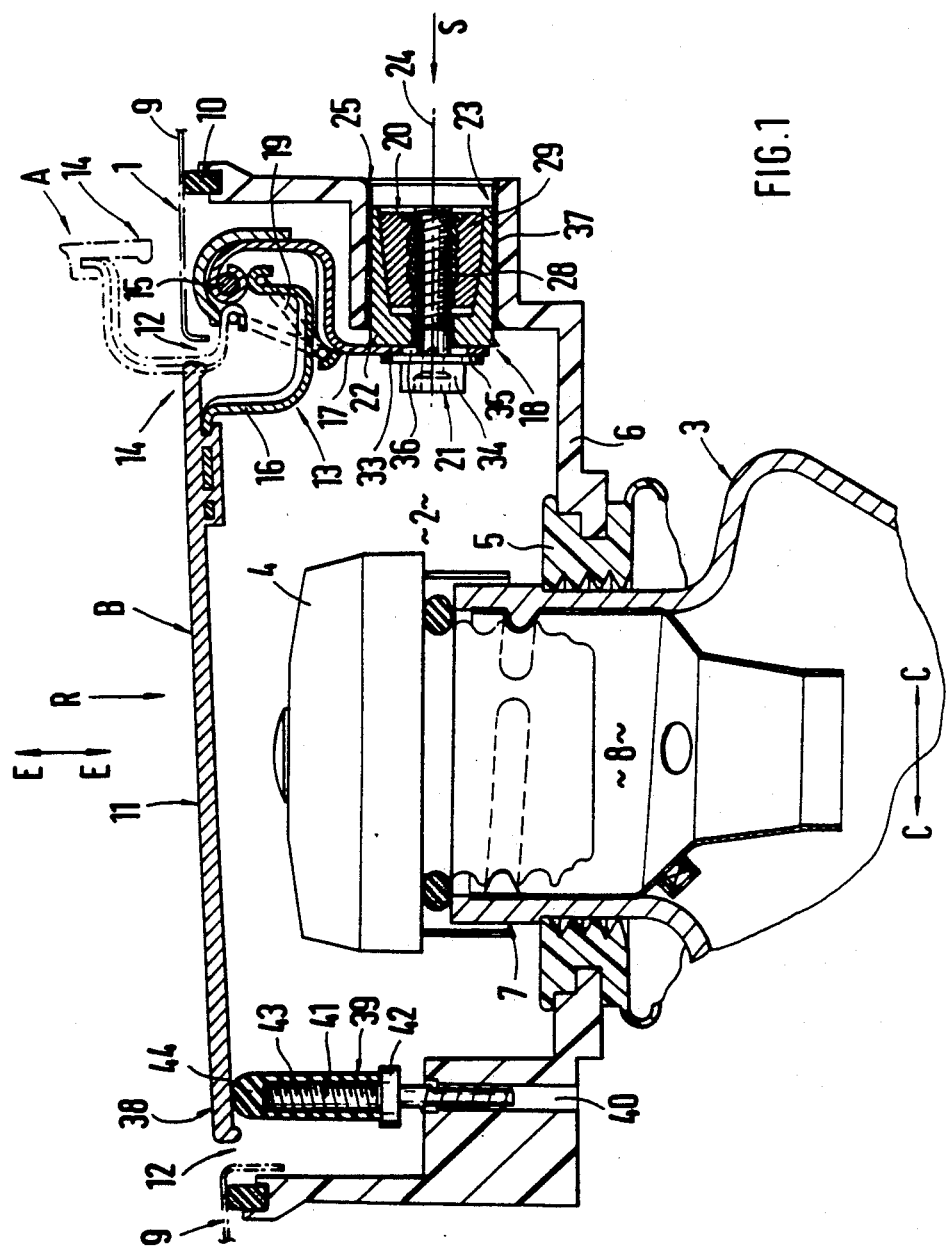
FIG. 1 is a schematic horizontal sectional view of a lid together with a body recess receiving a fuel filler neck, constructed in accordance with a preferred embodiment of the invention.

An automobile body 1, in the shown area, comprises a body recess 2 that is used for the sunk receiving of a fuel filler neck 3. The fuel filler neck 3, that on the end side is equipped with a detachable cap 4, is held in position at a floor wall 6 of the body recess 2 by means of a sealing element 5 that consists of an elastic material. A section 7 of the filler neck 3 that carries the cap 4 penetrates an opening 8 of the floor wall 6.

The body recess 2, according to FIG. 1, is formed by a cup-shaped component that is preferably made of plastic and that is placed onto the interior side of the adjacent outer wall 9 of the body and is connected with it by means of an adhesive element 10. For covering the filler neck 3, a pivotable lid 11 is provided that, in its closed position, extends with respect to the adjacent surface of the body so that it is flush with the shell of the body, in which case, between the edge of the lid 11 and the outer wall 9 of the body, a surrounding gap 12 is provided. The lid 11 that in the embodiment in top view is approximately circular, is pivotally connected to the body recess 2 by means of a hinge 13, this hinge being developed as a lift-out hinge; i.e., in the open position A of the lid 11, the edge area 14 of the lid 11 that faces the hinge 13 extends outside the outer wall 8 of the body.

The hinge 13 comprises two hinge arms 16, 17 that are connected by a hinge shaft 15 and that each have a U-shaped section adjacent to the hinge shaft 15. The hinge arm 16, with its free end, is fixed at the interior side of the lid 11. The other hinge arm 17 that faces the body recess 2, is held in position at the body recess 2, by means of an adjusting device 18. Connected with the hinge arms 16, 17 is a spring element 19 that holds the lid 11 in a predetermined position in the open position A as well as in the closed position B.

Figure 2:
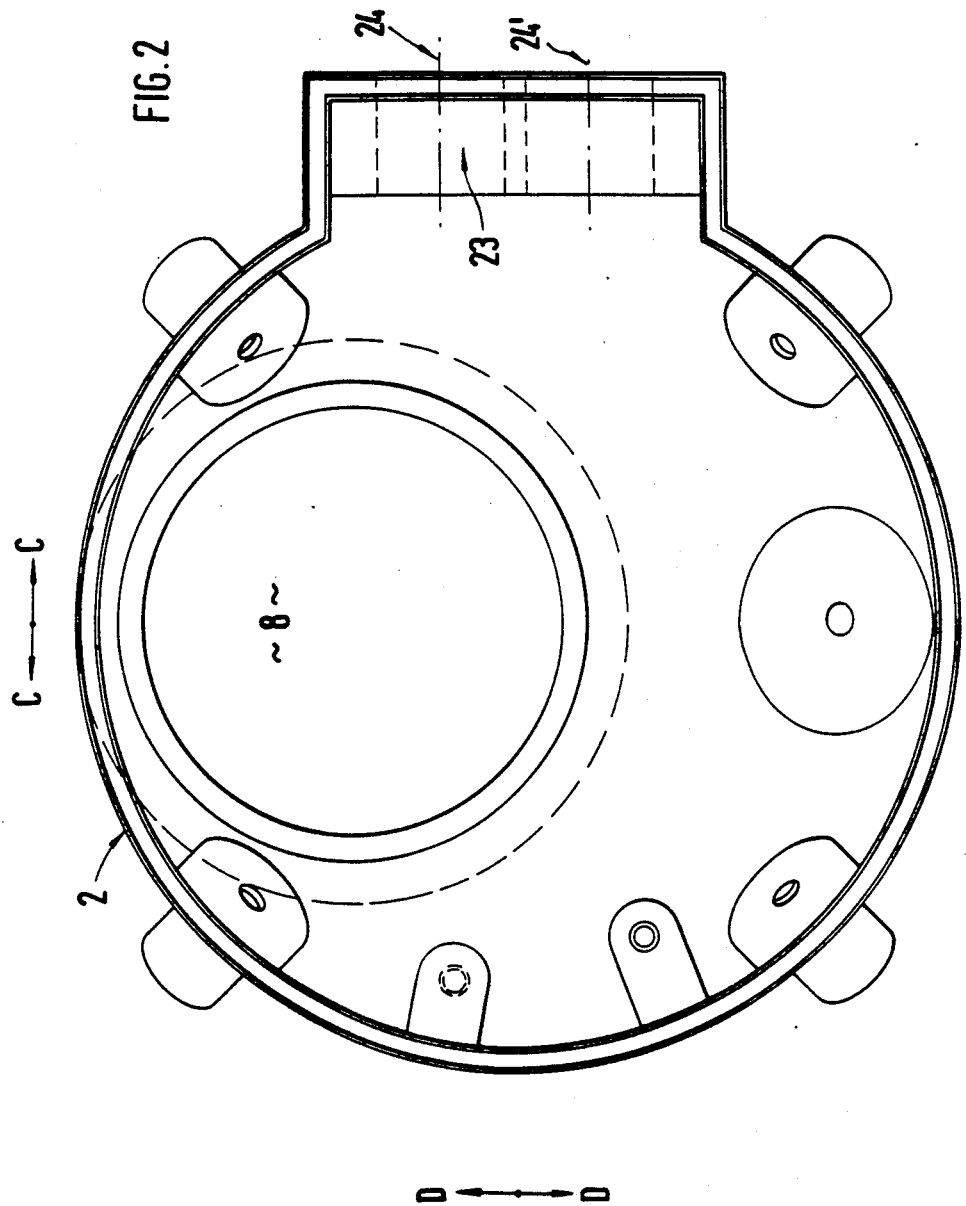
FIG. 2 is a partial view in the direction of the Arrow R of FIG. 1 of the body recess.

The adjusting device 18 comprises an inner expanding cone 20, an axial tension element 21, an outer clamping part 22 and a receiving device 23 that is developed in one piece with the body recess 2. The preferably cylindrical receiving device 23 has a central axis 24 that extends approximately in parallel and at a distance with respect to the floor wall 6 of the body recess 2. The receiving device 23 is developed to be open at both ends and has chamferings 25 for inserting the adjusting device 18. In top view, the receiving device 23 is arranged laterally outside the lid 11 (FIG. 2). The clamping part 22 and the expanding cone 20 are inserted into the receiving device 23 and are axially slidable and fixable in it. The clamping part 22 that has a cylindrical outer contour has a passage opening for the tension element 21 and a truncated-cone-shaped recess 26 for receiving the expanding cone 20. The expanding cone 20 is provided with an internal thread 27 that interacts with an external thread 28 of the tension element 21. By the turning of the tension element 21, that is formed preferably by an adjusting screw, the expanding cone 20 is moved in the direction of a head section 34 of the tension element 21, whereby the exterior clamping part 22 is radially expanded and braced against the interior surface of the receiving device 23. The expanding cone 20 and the clamping part 22 are preferably made of plastic.

According to FIG. 5, the internal thread 27 of the expanding cone 20 is formed by a threaded insert 29 that is inserted into the expanding cone 20. Between the expanding cone 20 and the clamping part 22, a protection 30 against torsion is provided that is formed by a molded-on part 31 at the truncated-cone-shaped clamping part 22 and a corresponding beveling 32 at the expanding cone 20. The hinge arm 17 facing the body recess 2, with its free end, is clamped in between a front face 33 of the clamping part 22 and a disk 35 that is arranged adjacent to the head section 34. On the side that faces the filler neck 3, the clamping part 22 projects out of the receiving device 23 by a small amount. For the guiding-through of the tension element 21, a bore 36 is provided at the hinge arm 17, the diameter of this bore 36 being significantly larger than the shaft diameter of the tension element 21.

The screw head 34 extends inside the body recess 2 and is freely accessible when the lid 11 is open. According to FIG. 2, for the fastening of the lid 11, two receiving devices 23 are provided that extend at a distance from one another and have assigned adjusting devices 18, the central axes of the receiving devices being marked with the reference numbers 24, 24'.

Corresponding to FIG. 1, a bearing bush 37 made of metal is inserted into the cylindrical receiving device 23, the clamping part 22 being braced against this bearing bush 37 by means of the tension element 21 and the expanding cone 20. By means of the clamping part 22, the tension element 21 and the expanding cone 20, the lid 11 can be slid in the direction C—C (longitudinal direction of the vehicle), whereby a constant gap 12, on the side of the circumference, can be adjusted between the lid 11 and the adjacent outer wall 9 of the body. An adjustability in D—D direction (transverse direction of the vehicle) and E—E direction (vertical axis of the vehicle) is ensured by the bore 36 provided at the hinge arm 17.

An area 38 of the lid 11 that faces away from the hinge 13, in the closed position B, supports itself at a stop element 39 that is developed so that it can be adjusted in height. The stop element 39 that extends approximately vertically or perpendicularly with respect to the plane of the lid is turned into a passage bore 40 of the body recess 2. The stop element 39 comprises a cylindrical interior part 41 with a molded-on nut 42, an elastic buffer 44 being placed on a thread section 43 of the interior part 41 above the nut 42.

FIG. 6 shows another embodiment of an adjusting device 18 for the lid 11. The lid 11, the hinge 13, the body recess 2, the stop element 39 as well as the cylindrical receiving device 23 in this case are developed to be identical to those in the above-described embodiment. Instead of the expanding cone 20 and the clamping part 22, the axial tension element 21 is surrounded by a rubber element 45 that can be inserted into the receiving device 23 and can be slid in axial direction and locked. At the cylindrical rubber element 45, a passage opening 46 for the tension element 21 is provided. The hardness of the rubber element is about 80 to 100 shore A. By means of the tightening of the tension element 21, the rubber element 45 is expanded radially and braces with respect to the receiving device 23.

The hinge arm 17 extends between a front face 47 of the rubber element 45 and a disk 49 that supports itself at the head 48 of the tension element 21, in which case this disk 49 has a larger diameter than the head 48 of the tension element 21. For the adjustability in D—D direction and E—E direction, the hinge 13 also has bore 36 with a significantly larger diameter than the shaft diameter of the tension element 21.

A nut 50 is screwed onto the end that faces away from the head of the tension element 21 and supports itself at a circular plate 51 made of metal. The circular plate 51 is vulcanized onto the rubber element 45 and has a slightly smaller diameter than the receiving device 23.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. A lid arrangement for closing a filler inlet compartment body recess of a motor vehicle, comprising a lid means contained at an outer area of said filler inlet body recess and adjustably positionable thereat to provide a substantially uniform clearance between all edges of said lid and said body recess and in a smooth plane with vehicle body structure adjacent said body recess; said lid means being pivotally connected to a first hinge arm; a second hinge arm being pivotedly mounted to the first hinge arm at a point inside the body recess to define a hinge joint and held in position at the body recess by means of an adjusting means; said adjusting means comprising an inner expandable cone means located within a clamping means; said clamping means being axially slidable in a receiving means of said body recess; a tensioning means acting on said inner expandable cone means to cause said cone means to be lockingly secured in said receiving means; the tensioning means securing the second hinge arm means to the clamping means via an adjustable connection utilizing an enlarged bore means surrounding a shaft diameter of the tensioning means with a clearance.

2. A lid arrangement according to claim 1, wherein a central axis of the receiving device means extends approximately in parallel with respect to a floor wall of the body recess.

3. A lid arrangement according to claim 1, wherein the receiving device means—in top view—is arranged laterally outside the lid at the body recess.

4. A lid arrangement according to claim 1, wherein the receiving device means is developed to be cylindrical and open at both ends.

5. A lid arrangement according to claim 1, wherein the second hinge arm is located within the body recess and is clamped at a free end between a front face of said clamping means that projects out of said receiving means and a disk that is mounted adjacent to a head section of a tension element.

6. A lid arrangement according to claim 1, wherein the inner expandable cone means is radially expanded by said tensioning means and wherein said receiving means is disposed at a lateral side of the body recess.

7. A lid arrangement according to claim 1, wherein a cylindrical bearing bush made of metal is inserted into said receiving means.

8. A lid arrangement according to claim 1, wherein the expanding cone means has a threaded insert with an internal thread that interacts withthe tensioning means.

9. A lid arrangement according to claim 1, wherein there are two tensioning means arranged at a distance from one another for securing the second hinge arm.

10. A lid arrangement according to claim 1, wherein an area of the lid that faces away from the hinge point, supports itself at an adjustable stop element, in the closed position.

11. A lid arrangement according to claim 10, wherein the stop element extends approximately at right angles with respect to a plane of the lid and which stop element is screwed into the body recess.

12. A lid arrangement according to claim 1, wherein the body recess is formed by a cup-shaped component made of plastic that is placed into an interior side of an outer wall of the vehicle body and with an open end of said cup-shaped component adjacent said vehicle body secured thereto by a gluing element being provided between the component and the outer wall of the vehicle body.

13. A lid arrangement according to claim 1, wherein a protection device against torsion is provided between the expanding cone means and the clamping means.

* * * * *